US008882119B2

(12) United States Patent
Burns, Jr.

(10) Patent No.: US 8,882,119 B2
(45) Date of Patent: Nov. 11, 2014

(54) SHORT TURN RADIUS STEERING SYSTEM

(75) Inventor: Duncan Burns, Jr., Charleston, SC (US)

(73) Assignee: Husqvarna AB, Huskvarna (SE)

(*) Notice: Subject to any disclaimer, the term of this patent is extended or adjusted under 35 U.S.C. 154(b) by 0 days.

(21) Appl. No.: 13/990,656

(22) PCT Filed: Dec. 28, 2010

(86) PCT No.: PCT/US2010/062249
§ 371 (c)(1),
(2), (4) Date: May 30, 2013

(87) PCT Pub. No.: WO2012/091699
PCT Pub. Date: Jul. 5, 2012

(65) Prior Publication Data
US 2013/0249179 A1    Sep. 26, 2013

(51) Int. Cl.
*B62D 7/16*    (2006.01)
*B62D 7/06*    (2006.01)
*B62D 7/08*    (2006.01)
*B62D 3/02*    (2006.01)

(52) U.S. Cl.
CPC .. *B62D 7/08* (2013.01); *B62D 3/02* (2013.01); *B62D 7/16* (2013.01)
USPC ........................................ 280/98; 280/93.502

(58) Field of Classification Search
CPC .............. B62D 7/06; B62D 7/08; B62D 7/16; B62D 7/09; B62D 7/163; B62D 7/166; B62D 7/20; B62D 3/00; B62D 3/12
USPC ............ 280/98, 103, 93.502, 93.504, 93.507, 280/93.508, 93.51, 93.511, 771; 180/6.32, 180/6.34
See application file for complete search history.

(56) References Cited

U.S. PATENT DOCUMENTS

| 1,461,965 | A | * | 7/1923 | Bolte | 280/124.113 |
| 1,920,651 | A | * | 8/1933 | Mackenzie | 280/124.136 |
| 2,461,775 | A | * | 2/1949 | Roos | 280/124.113 |
| 3,587,767 | A | * | 6/1971 | Gamaust | 180/431 |
| 4,220,348 | A | * | 9/1980 | Low | 280/93.506 |

(Continued)

FOREIGN PATENT DOCUMENTS

| CN | 201091097 Y | 7/2008 |
| EP | 1180468 A1 | 2/2002 |
| JP | 3892378 B2 | 3/2007 |

OTHER PUBLICATIONS

International Search Report and Written Opinion of PCT/US2010/062249 mailed Sep. 30, 2011.

(Continued)

*Primary Examiner* — Ruth Ilan
(74) *Attorney, Agent, or Firm* — Nelson Mullins Riley & Scarborough LLP

(57) ABSTRACT

To reduce the complexity, maintenance, and cost, and to increase the reliability of a riding lawnmower employing a short turn radius steering system, the riding lawn mower may be configured with a linkage and steering assembly that eliminates or reduces complicated gearing. A riding lawn mower may comprise a link system, pivot brackets, and spindle assemblies. The geometry of the steering system may be configured to provide a turn radius of seven inches or less. Moreover, the geometry of the steering system may be configured to provide Ackerman steering, such that, the inside wheel turns sharper than the outside wheel in a turn.

19 Claims, 10 Drawing Sheets

(56) References Cited

U.S. PATENT DOCUMENTS

| | | | |
|---|---|---|---|
| 4,708,363 A * | 11/1987 | Hata | 280/771 |
| 5,236,059 A | 8/1993 | Overocker | |
| 6,131,689 A * | 10/2000 | Nodorft et al. | 180/409 |
| 6,308,976 B1 * | 10/2001 | Mitchell | 280/419 |
| 6,402,170 B1 * | 6/2002 | Hurlburt | 280/103 |
| 6,675,925 B2 * | 1/2004 | Takahashi et al. | 180/266 |
| 6,904,985 B2 * | 6/2005 | Ferree et al. | 180/6.32 |
| 2002/0017780 A1 | 2/2002 | Erickson et al. | |
| 2005/0145421 A1 * | 7/2005 | Ishimori | 180/6.32 |
| 2007/0144796 A1 * | 6/2007 | Schaedler et al. | 180/6.24 |
| 2007/0284839 A1 * | 12/2007 | Sasaoka | 280/93.502 |
| 2009/0276122 A1 * | 11/2009 | Demong et al. | 701/41 |

OTHER PUBLICATIONS

Chapter II International Preliminary Report on Patentability of PCT/US2010/062249 mailed Mar. 21, 2013.

* cited by examiner

312

426

SHORT TURN RADIUS STEERING SYSTEM

TECHNICAL FIELD

The present disclosure relates to vehicles, and in particular, to vehicles configured for lawn maintenance including cutting grass.

BACKGROUND

Grass is commonly maintained with lawn care machinery such as, for example, walk behind lawn mowers, riding lawn mowers, lawn tractors, and/or the like. Riding lawn mowers often provide the convenience of a riding vehicle and a larger cutting deck than typical walk-behind lawn mowers.

Typically, a riding lawnmower has a large turn radius making it difficult to operate in tight spaces and forcing an operator to make wide turns. This generally increases cut time (e.g. the time it takes to a cut a lawn) and requires additional equipment to cut an entire lawn. Short turn radius steering systems have been developed; however, these systems often employ complex gearing and linkage system. Many of the existing short turn radius steering systems are susceptible to failure related to wear and stress. Moreover, these existing systems are usually expensive and difficult to maintain because they are complex. As such, there is a need for a riding lawnmower with a short turn radius steering system that is easy and inexpensive to maintain and reliable to operate.

SUMMARY

The present disclosure is directed to a steering system for a riding lawnmower that provides a short turn radius. In one embodiment, the turn radius provided by the steering system is approximately seven inches or less. Moreover, the steering system is not only reliable, but also easy and inexpensive to maintain.

In one embodiment, a short turn radius steering system comprises a linkage, a pivot bracket, a bracket linkage, and a spindle assembly. The pivot bracket may couple to the linkage. The spindle assembly may couple to the pivot bracket through the bracket linkage. The linkage may be configured to move in a first direction and causing the pivot bracket to translate the motion such that the bracket linkage moves. The steering system may provide a turn radius of approximately five inches or less. The spindle assembly may comprise a spindle arm and a pitman arm, such that the pivot bracket is configured to conduct a force from the linkage to the pitman arm causing the spindle to move. The spindle arm may be coupled to a wheel. The pitman arm may comprise a tab. The tab of the pitman arm may be configured to restrict the wheel from turning more than 90 degrees in one direction. The pivot bracket may be configured to rotatably couple to an axle of a riding vehicle.

The steering system may also comprise a pivot bolt, which has a rotating surface and an engagement. The rotating surface may be configured to support the pivot bracket and the engagement may couple to the axle. The pivot bolt may have a hollow cavity along its centerline and a cross passage perpendicular to the hollow cavity. The pivot bolt may be configured to receive a lubricant through the hollow cavity and provide the lubricant to the rotating surface through the cross passage.

In an exemplary embodiment, a riding lawnmower may comprise a steering system with a user input, an axle, and left and right wheels. The steering system may comprise left and right steering linkages, left and right pivot brackets, and left and right spindle assemblies. The left steering linkage may couple to and conduct a force through the left pivot bracket to the left spindle assembly, which causes the left wheel to move. Similarly, the right steering linkage may couple to and conduct a force through the right pivot bracket to the right spindle assembly, which causes the right wheel to move. The left spindle assembly and right spindle assembly may each comprise a spindle arm and a pitman arm. Each of the pitman arms may comprise a tab that is configured to contact the axle to restrict the left or right wheel from turning more than 90 degrees, when the respective wheel is turned toward the centerline of the riding lawnmower. Moreover, in a turn, the geometry of the steering system causes the one wheel (e.g. the inside wheel) to turn sharper than the other wheel (e.g. the outside wheel).

The axle and the steering system may each comprise a lubricating system that is configured to provide a lubricant to each of the left and right spindle assemblies, and each of the left and right pivot brackets, to reduce wear and/or contamination.

BRIEF DESCRIPTION OF THE DRAWINGS

A more complete understanding may be derived by referring to the detailed description and claims when considered in connection with the Figures, wherein like reference numbers refer to similar elements throughout the Figures, and:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

For the sake of brevity, conventional techniques for mechanical system construction, management, operation, measurement, optimization, and/or control, as well as conventional techniques for mechanical power transfer, modulation, control, and/or use, may not be described in detail herein. Furthermore, the connecting lines shown in various figures contained herein are intended to represent exemplary functional relationships and/or physical couplings between various elements. It should be noted that many alternative or additional functional relationships or physical connections may be present in a short turn radius steering system.

Principles of the present disclosure reduce and/or eliminate problems with prior short turn radius steering systems. For example, the present short turn radius steering system eliminates the need for a geared steering mechanism. The reliability of the short turn radius steering system is improved by reducing the wear to (and number of) steering system components. Similarly, the maintenance of the short turn radius steering system is reduced by reducing the number and/or complexity of steering system components.

Figure 1A:
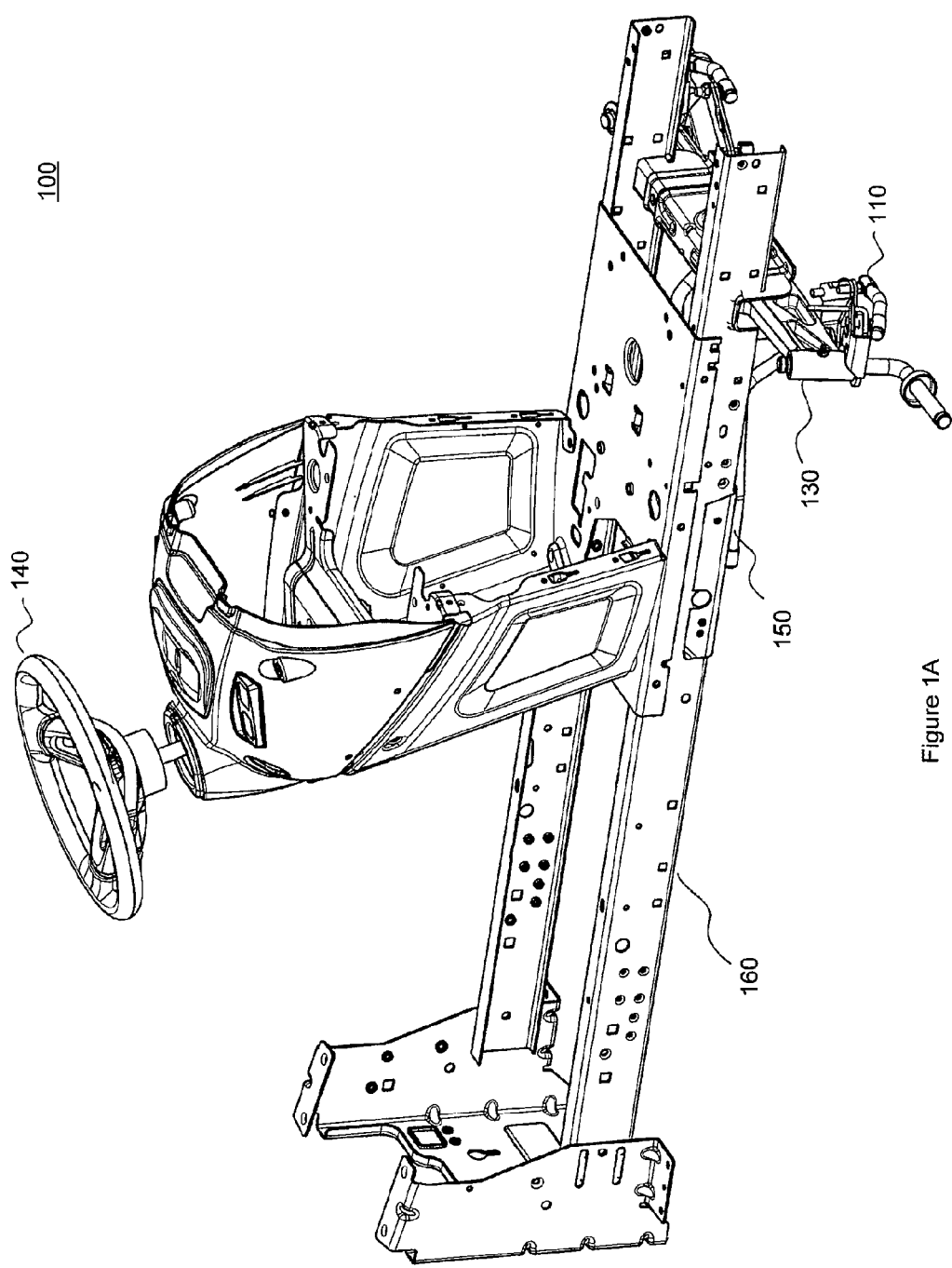
FIG. 1A illustrates a top perspective view of an exemplary short turn radius steering system mounted to a riding vehicle chassis, in accordance with an exemplary embodiment.
Figure 1B:
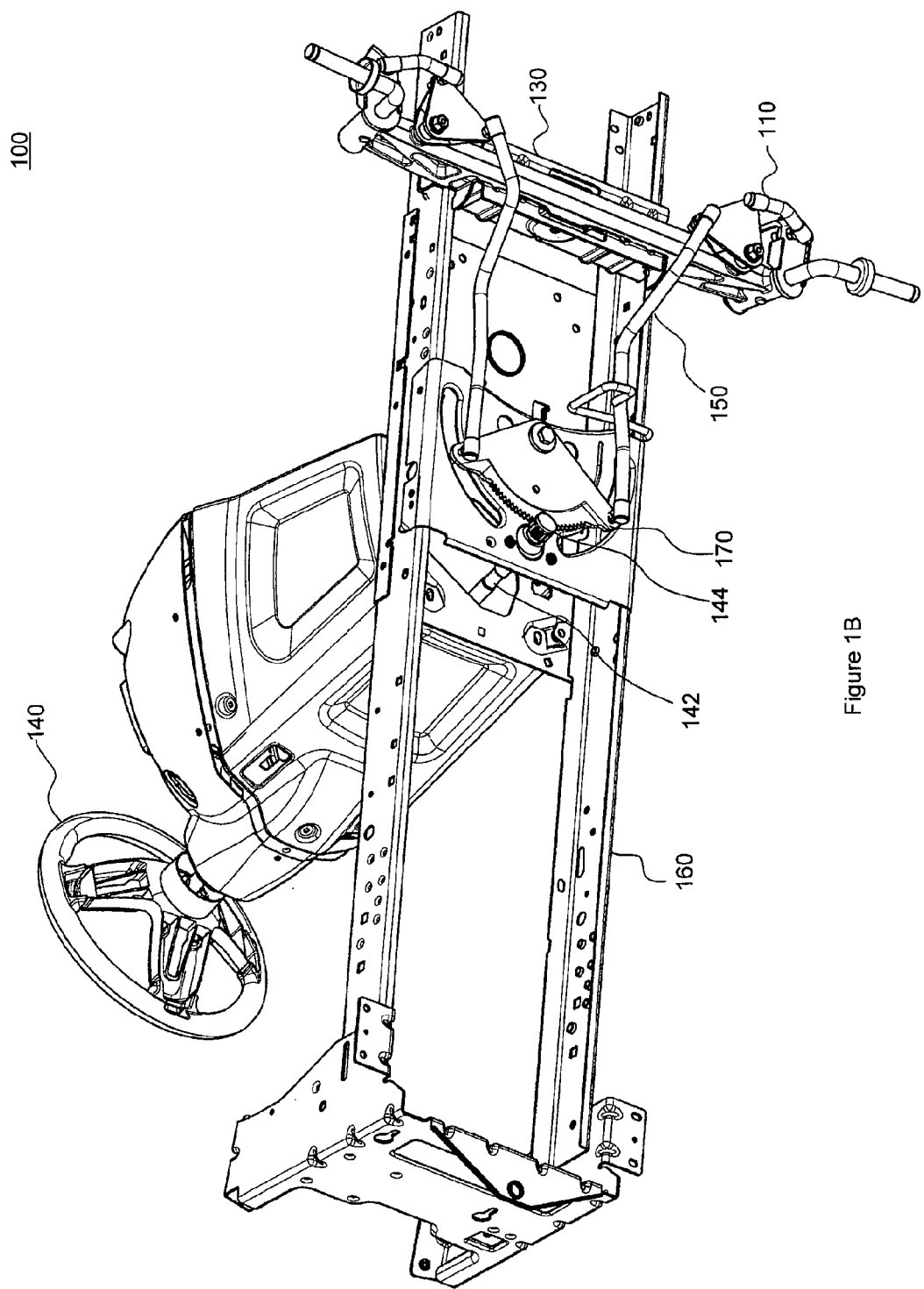
FIG. 1B illustrates a bottom perspective view of an exemplary short turn radius steering system mounted to a riding vehicle chassis, in accordance with an exemplary embodiment.
Figure 1C:
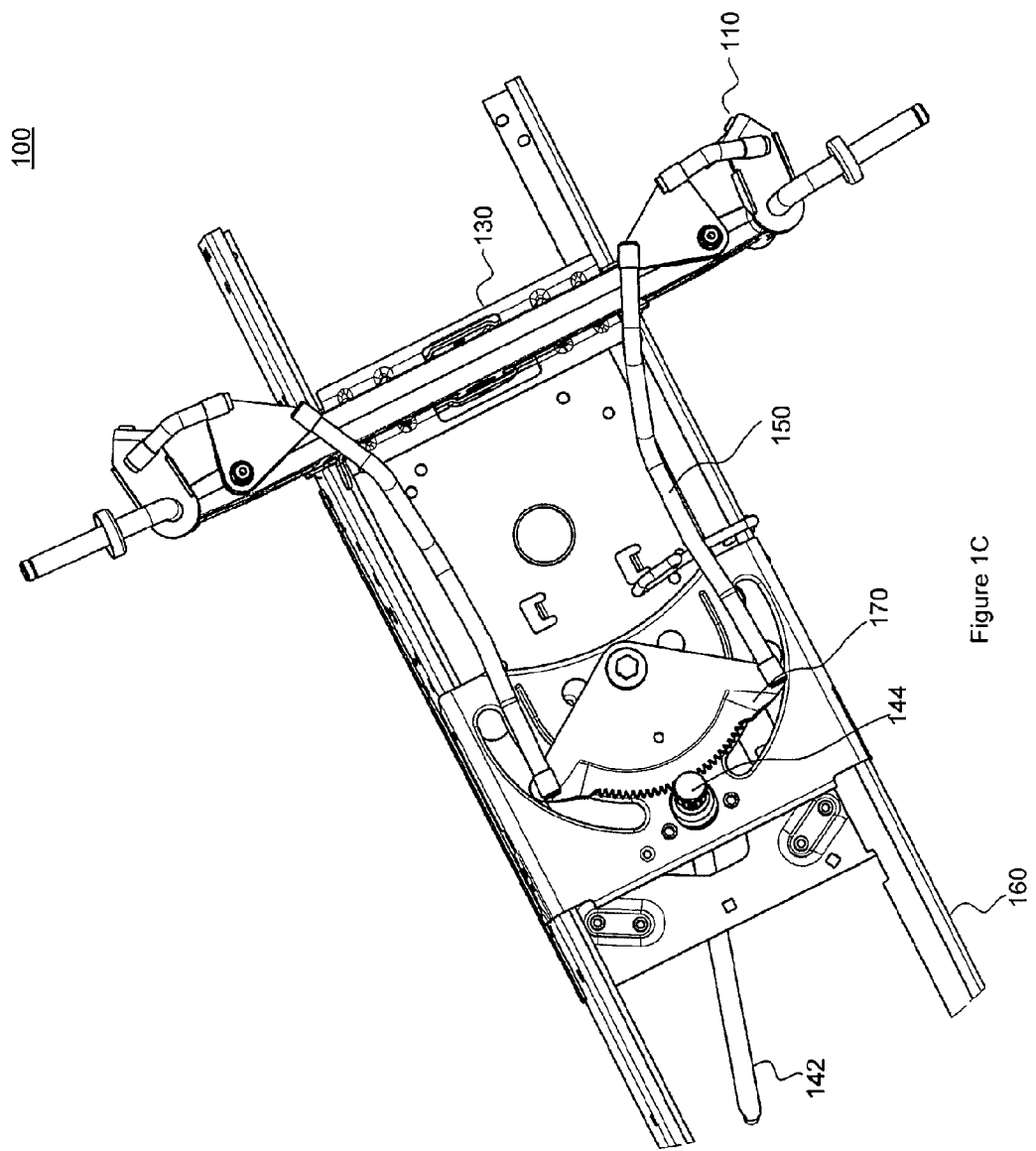
FIG. 1C illustrates a bottom view of an exemplary short turn radius steering system mounted to a riding vehicle chassis, in accordance with an exemplary embodiment.

In various exemplary embodiments, with reference to FIG. 1A, FIG. 1B, and FIG. 1C, a short turn radius steering system 100 ("STRSS 100") may be any mechanical or electro-mechanical system configured steer a vehicle. STRSS 100 may be configured to provide a short turn radius. For example, the steering system may be configured to provide a turn radius of approximately seven inches or less, when coupled to a vehicle. The vehicle may be a riding vehicle such as, for example, a riding lawnmower (as will be discussed herein as an example). STRSS 100 may comprise a steering assembly 110, an axle 130, a user input 140, and a link 150. STRSS 100 may be configured to couple to frame 160. STRSS 100 may also be configured to couple to or otherwise interface with a housing and/or power train.

STRSS 100 may further comprise an input transfer mechanism 170. Input transfer mechanism 170 may be any mechanical or electro-mechanical device configured to conduct an input from user input 140 to linkage 150. For example, input transfer mechanism 170 may be a gear including, for example, a sector gear, a rack, a linkage, or any other device suitable mechanism for transferring an input.

User input 140 may comprise or otherwise couple to a shaft 142 and an engagement 144. Shaft 142 may be a mechanical or electro-mechanical device configured to translate an input from user input 140 to transfer mechanism 170 and/or steering assembly 110. Engagement 144 may be any mechanical or electro-mechanical device configured to interface with transfer mechanism 170. For example, engagement 144 may be a gear including, for example, a spline gear, a pinion, and/or the like. In one embodiment, shaft 142 and engagement 144 may be coupled together as an assembly or may be formed as a single homogenous structure. Shaft 142 may be made of any suitable material that resists wear including, for example, metal, plastic, a composite material, a polymer material, and the like. Similarly, engagement 144 may be made of any suitable material that resists wear including, for example, metal, plastic, a composite material, a polymer material, and the like.

Steering assembly 110 may couple to or mount on axle 130. Steering assembly may also be coupled to link 150. Steering assembly 110 may be controlled or configured to receive inputs from user input 140 through transfer mechanism 170. For example, steering assembly 110 is coupled to link 150. Link 150 is coupled to transfer mechanism 170. User input 140 is configured to operatively engage transfer mechanism 170 through shaft 142 and engagement 144. Steering assembly 110 may be configured to receive an input from user input 140. The input may be translated from user input 140 along shaft 142 through engagement 144 to transfer mechanism 170. Transfer mechanism 170 may actuate link 150 and provide the input to steering assembly 110.

Figure 2A:
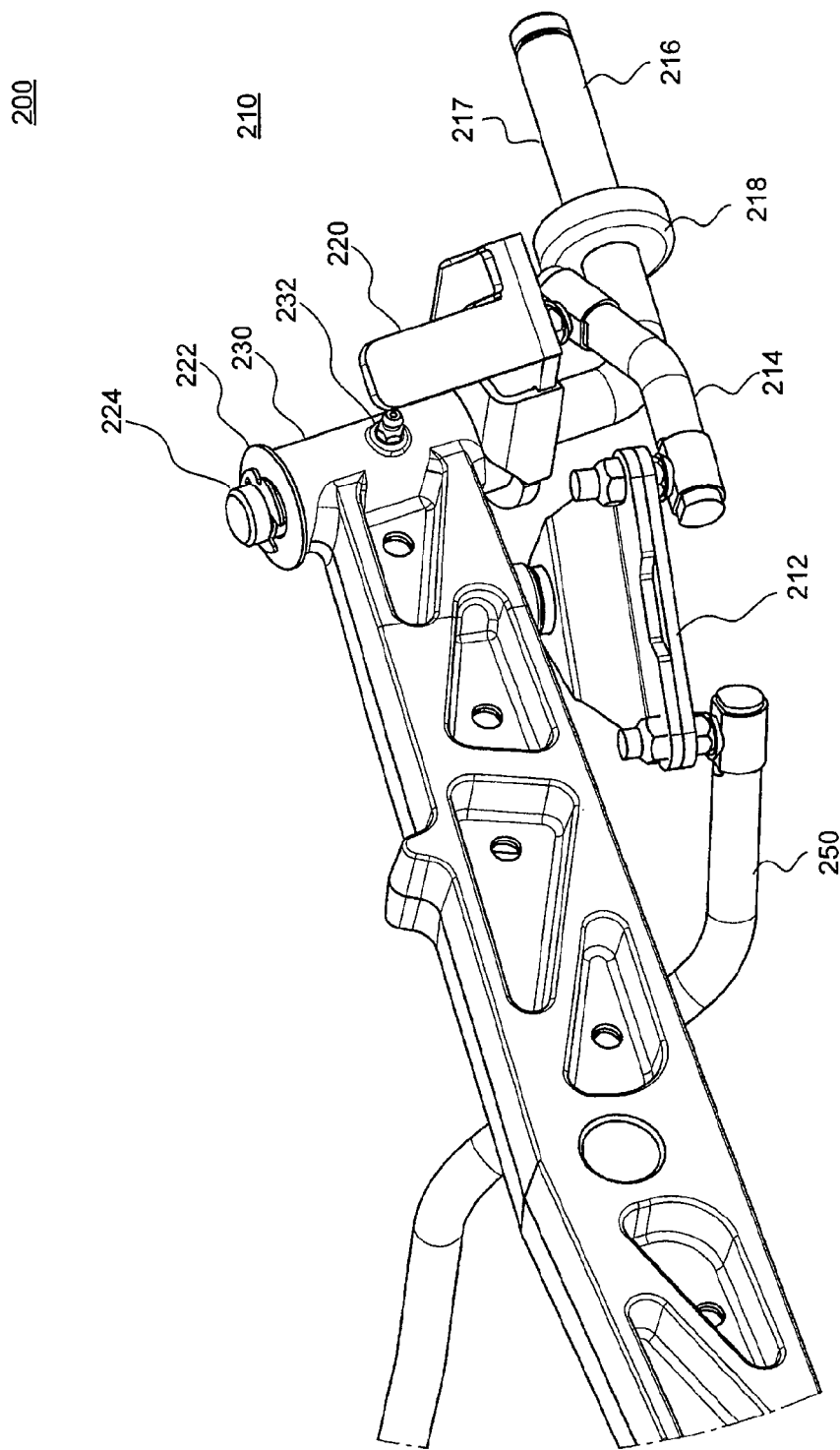
FIG. 2A illustrates a perspective view of exemplary short turn radius steering system components mounted to an axle, in accordance with an exemplary embodiment.
Figure 2B:
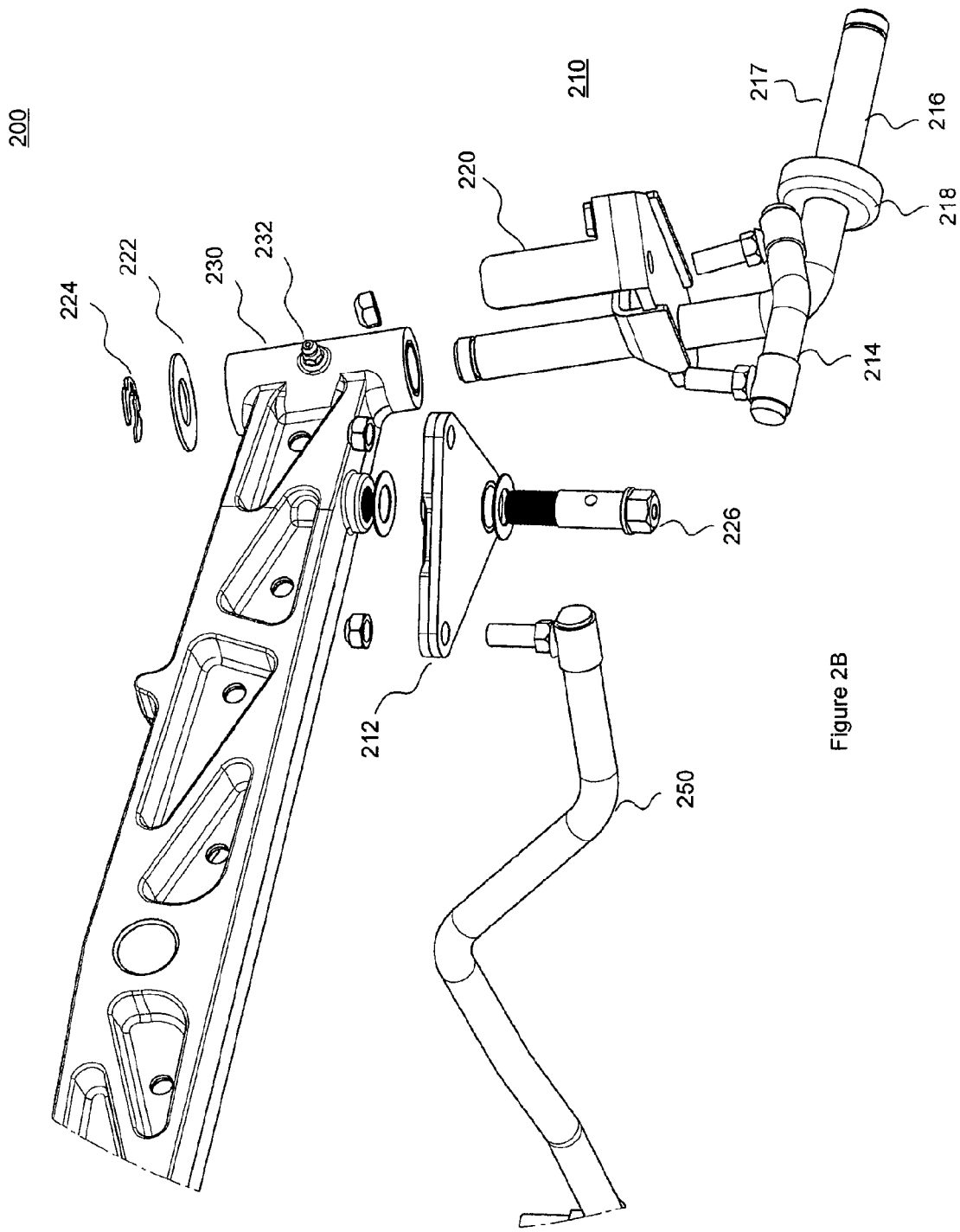
FIG. 2B illustrates an exploded view of exemplary short turn radius steering system components mounted to an axle, in accordance with an exemplary embodiment.

In an exemplary embodiment, with reference to FIG. 2A and FIG. 2B, steering assembly 210 may be any mechanical or electro-mechanical system configured to achieve a short turn radius in response to a user input. In particular, steering assembly 210 may be configured to achieve a turn radius of about 90 degrees. Steering assembly 210 may comprise a pivot bracket 212, a bracket linkage 214, and a spindle assembly 216. Pivot bracket 212 may couple to spindle assembly via bracket linkage 214.

Steering assembly 210 may be configured to operatively couple to linkage 250. Steering assembly 210 may also be rotatably coupled to and retained at axle 230 by bolt 226. In one embodiment, pivot bracket 212 may be configured to rotate about bolt 226 in response to an actuation of linkage 250 (based on an input from user input 140 as shown in FIG. 1A and FIG. 1B). The rotation of pivot bracket 212 may be transferred through bracket linkage 214 to spindle assembly 216, causing spindle assembly 216 to rotate in response to the actuation of linkage 250. In response to linkage 250 moving in a direction parallel to the centerline of frame 160 (and perpendicular to axle 230), pivot bracket 212 transfers motion in a direction perpendicular to frame 160 (and parallel to axle 230).

In an exemplary embodiment, spindle assembly 216 may be any structure suitably configured to retain and steer a wheel. Spindle assembly may comprise a spindle arm 217, a stop 218 and a pitman arm 220. Spindle arm 217 may comprise a first end and a second end. At the first end, spindle arm 217 may be configured to rotatably couple to a\the wheel. The wheel may be held in place by stop 218 on one side and by a suitable retainer (e.g. a retainer clip, a fastener, or any other suitable retainer) on the other side. Spindle arm 217 may be coupled to pitman arm 220. Spindle arm 217 and pitman arm 220 may be coupled to one another. For example, spindle arm 217 may be coupled to pitman arm 220, such that movement of pitman arm 220 causes rotation of spindle arm 217.

At the second end, spindle assembly 216 may be configured to rotatably couple to axle 230. Spindle assembly 216 may be supported and/or retained within axle 230 by any suitable method. For example, spindle arm 217 may be supported and retained by a washer 222 and retained by a clip 224. Spindle arm 217 may be configured with a retaining slot, such that when spindle arm 217 is coupled to axle 230, the slot of spindle arm 217 may be engaged by clip 224.

Axle 230 may be configured with a grease fitting 232 (e.g. grease zerk 232). Grease fitting 232 may be any suitable structure for receiving and conducting a lubricant (e.g. grease, oil, and the like). When spindle arm 217 is coupled to axle 230, a lubricant may be supplied through grease fitting 232 to supply a lubricant to spindle arm 217, such that the amount of heat, wear, and debris is reduced between spindle arm 217 and axle 230. The addition of the lubricant also provides for smoother rotation at the rotatable joint created when spindle arm 217 is couple to axle 230.

Spindle arm 217 may be made of any suitable material to carry a load and inhibit wear. For example, spindle arm 217 may be made of a metal (e.g. steel, titanium, an alloy, and the like), a composite, a polymer or any other suitable material, now known or hereinafter devised. Moreover, spindle arm 217 may be processed in any suitable fashion to inhibit wear and reduce failure. For example, spindle arm 217 may be hardened, stress relieved (e.g. by shot peening), coated (e.g. chromed), or subject to any other suitable processing, now known or hereinafter devised.

In one embodiment and with continued reference to FIG. 2A and FIG. 2B, pitman arm may be any structure suitable configured to transfer a force and resulting movement. As discussed above, pitman arm 220 may be coupled to spindle arm 217. Pitman arm 220 may also be coupled to pivot bracket 212 through linkage 214. Thus, where a force applied to linkage 250 causing linkage 250 to move, the movement (and associated force) are transferred to pivot bracket 212, which rotates about bolt 226. The motion and resulting force are applied to bracket linkage 214, which causes movement of pitman arm 220 and, as such, causes movement of spindle arm 217. As such, the linear motion of linkage 250 in a first direction is translated through pivot bracket 212 and causes linear motion in a second direction (e.g. perpendicular to the first direction) of bracket linkage 214. As used herein, "linear" may include fully linear, substantially linear, partially linear, about linear, and/or certain non-linear deviations.

Pitman arm 220 may be configured with a tab. As discussed above the STRSS 100 is configured to provide a turn radius of substantially 90 degrees. However, in order to insure that STRSS 100 does not allow the wheel of a riding vehicle to turn past 90 degrees, STRSS 100 may be configured with a stop. As such, the tab of pitman arm 220 may be configured and dimensioned such that it contacts and/or engages axle 230 to restrict steering assembly 210 from achieving a turn radius that is greater than 90 degrees when the wheel is turned toward the centerline of a riding vehicle. A turn radius that is greater than 90 degrees may make a riding vehicle difficult to control or may overstress steering components.

Pitman arm 220 may be made of any suitable material to carry a load to, conduct a force, and inhibit wear. For example, pitman arm 220 may be made of a metal (e.g. steel, titanium, an alloy, and the like), a composite, a polymer or any other suitable material, now known or hereinafter devised. Moreover, pitman arm 220 may be processed in any suitable fashion to inhibit wear and reduce failure. For example, pitman arm 220 may be hardened, stress relieved (e.g. by shot peening), coated (e.g. chromed), or subject to any other suitable processing, now known or hereinafter devised.

Figure 3A:
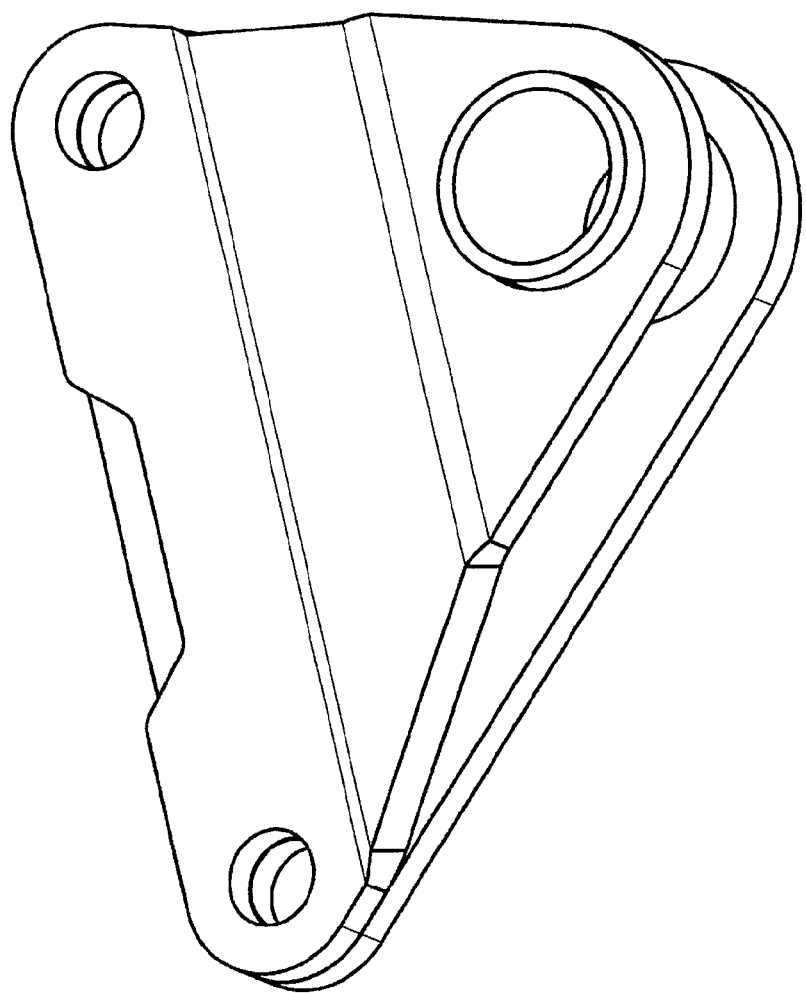
FIG. 3A illustrates a perspective view of an exemplary pivot bracket, in accordance with an exemplary embodiment.
Figure 3B:
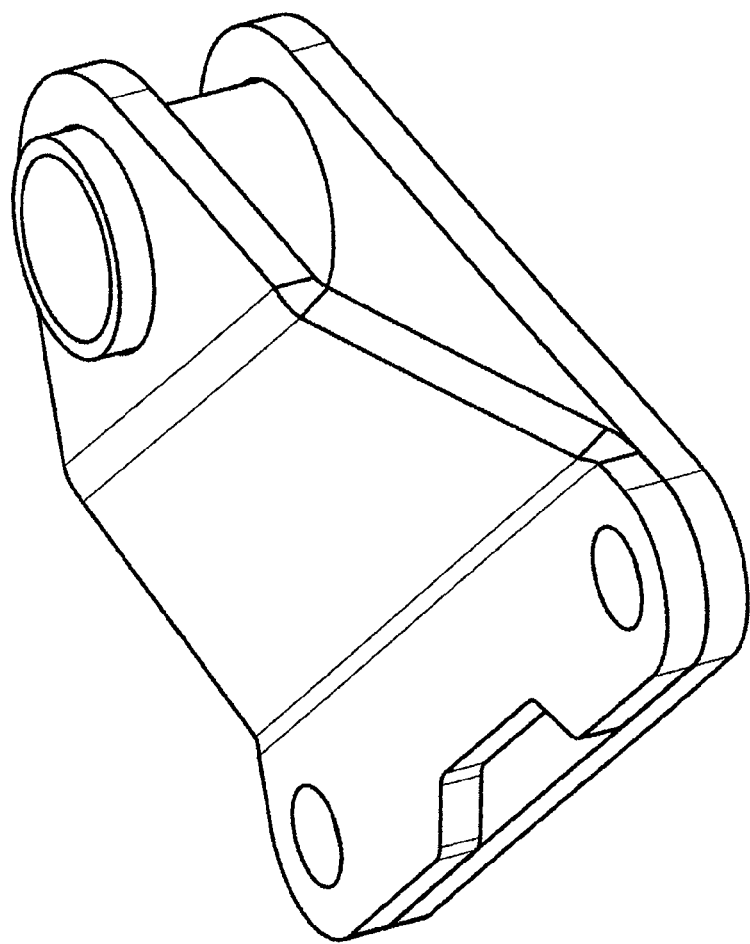
FIG. 3B illustrates a perspective view of an exemplary pivot bracket, in accordance with an exemplary embodiment.

In an exemplary embodiment, with reference to FIG. 3A and FIG. 3B, pivot bracket 312 may be any mechanism configured to translate motion. Pivot bracket may be monolithic or may be an assembly. Each of the top plate and the bottom plate may be configured with one of more coupling points (e.g. holes, threaded studs, and/or the like). Each of the top plate and the bottom plate may also be configured with a hole configured to accept a structure to facilitate rotation. For example, pivot bracket 312 may be configured with a top plate, a bottom plate, and a sleeve. The top plate may comprise a contour, such that, when coupled to the bottom plate there is a gap between the top and bottom plates in the region of the hole configured to accept a structure to facilitate rotation (e.g. pivot hole). The sleeve may be installed at the gap between the top plate and the bottom plate, in each of the top pivot hole and bottom pivot hole. As such, the sleeve acts as a support for a rotating structure such as, for example, a bolt, a spindle, and an axle, or the like. The sleeve may be welded or otherwise fixedly attached to the top plate and the bottom plate to add additional structural support in the region of the pivot holes. Alternatively, a bolt, a spindle, an axle or other suitable rotating structure may be installed directly into the pivot holes of the top plate and the bottom plate.

Pivot bracket 312 may be configured with appropriate geometric proportions, such that Ackerman steering is achieved in a steering system employing pivot bracket 312. Ackerman steering describes the situation where the inside wheel of a vehicle is turned sharper than the outside wheel to reduce or prevent scrubbing of the tires. Pivot bracket 312 may be configured to couple to a linkage at a first coupling point, a bracket linkage at a second coupling point and rotate about a structure (e.g. a bolt) at a rotation point. In one embodiment, there may be a linear distance between the first coupling point and the second coupling point of approximately 3.000 inches to 3.700 inches. There may also be a linear distance between the first coupling point and the rotation point of approximately 1.600 inches to 2.250 inches. There may also be a linear distance between the second coupling point and the rotation point of approximately 1.600 inches to 2.250 inches.

Pivot bracket 312 may be made of any suitable material to carry a load, conduct a force, and inhibit wear. For example, pivot bracket 312 may be made of a metal (e.g. steel, titanium, an alloy, and the like), a composite, a polymer or any other suitable material, now known or hereinafter devised. Pivot bracket 312 may be produced using machined, cast, sintered, stamped (as individual components and assembled) parts, or parts made by any other suitable method. Moreover, pivot bracket 312 may be processed in any suitable fashion to inhibit wear and reduce or prevent failure. For example, pivot bracket 312 may be hardened, stress relieved (e.g. by shot peening), coated (e.g. chromed), or subject to any other suitable processing, now known or hereinafter devised.

Figure 4:
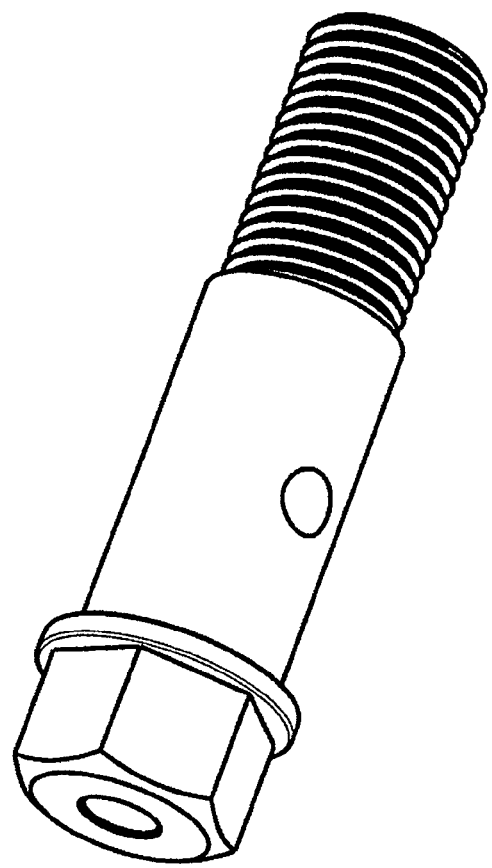
FIG. 4 illustrates a perspective view of an exemplary pivot bolt, in accordance with an exemplary embodiment.

In an embodiment and with reference to FIG. 4, bolt 426 may be any fastener suitably configured to support a pivot bracket and facilitate rotation. For example, bolt 426 may comprise threads, a rotating structure comprising a surface suitable for rotation, and a head. The threads may be coupled to the rotating structure. The rotating structure may be coupled to the head, such that the head provides a shoulder for a rotating structure (e.g. pivot bracket 312). Bolt 426 may be drilled along its centerline to provide a hollow cavity accessible through the head at an opening. The opening may be configured with threads and configured to accept a grease fitting (e.g. a grease zerk). Bolt 426 may also be cross-drilled to provide a passage, which couples the hollow cavity to the rotating surface. The hollow cavity may be used to supply a lubricant to the rotating surface when bolt 426 is installed with a rotating structure such as, for example, a pivot bracket. The lubricant reduces wear, friction, and contamination between the rotating surface and the rotating structure.

Bolt 426 may be made of any suitable material to carry a load and inhibit wear. For example, bolt 426 may be made of a metal (e.g. steel, titanium, an alloy, and the like), a composite, a polymer or any other suitable material, now known or hereinafter devised. Moreover, bolt 426 may be processed in any suitable fashion to inhibit wear and reduce or prevent failure. For example, bolt 426 may be hardened, stress relieved (e.g. by shot peening), coated (e.g. chromed, Teflon® coated, and the like), or subject to any other suitable processing, now known or hereinafter devised.

Figure 5:
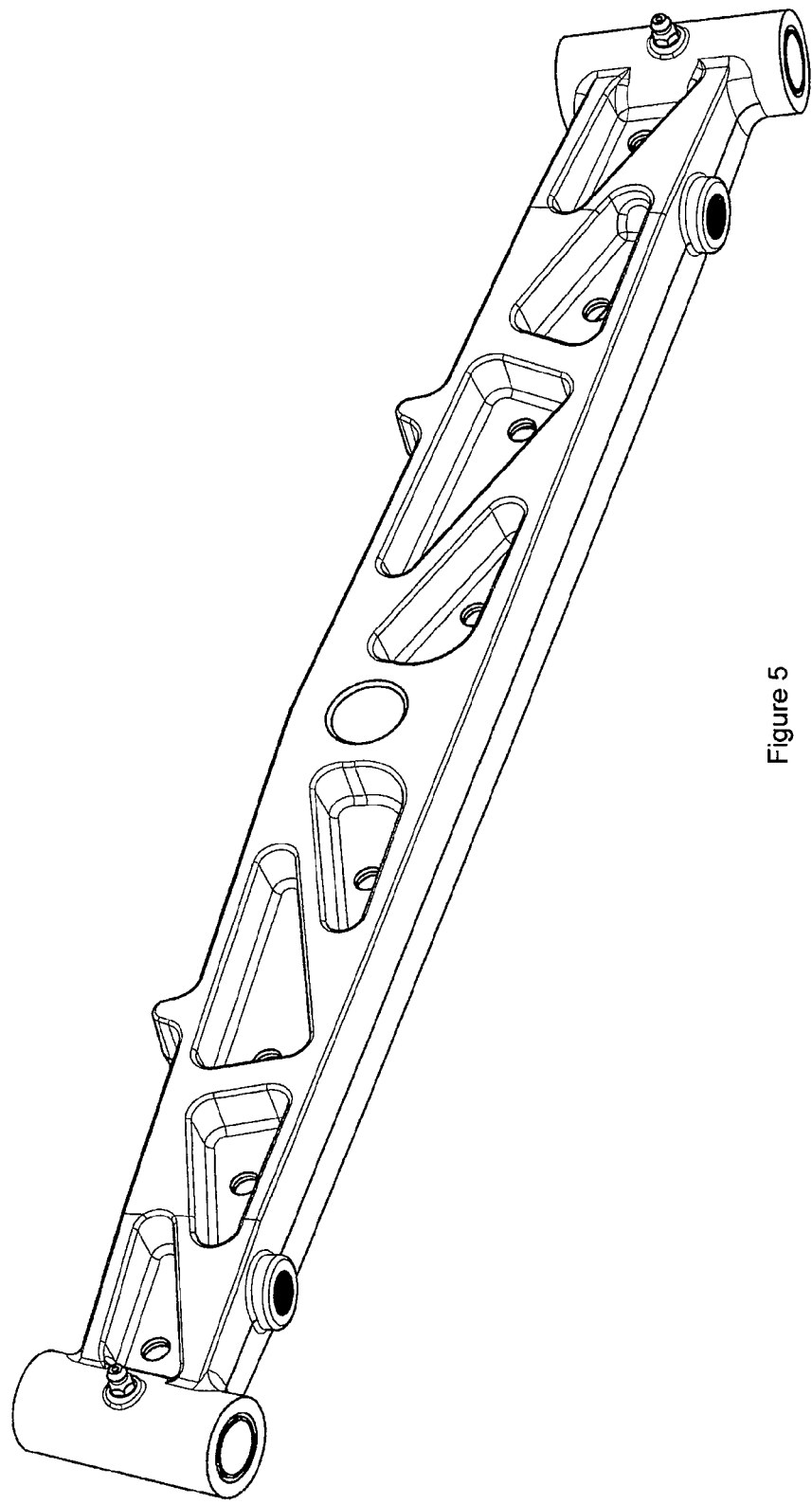
FIG. 5 illustrates a perspective view of an exemplary axle, in accordance with an exemplary embodiment.

In an exemplary embodiment and with reference to FIG. 5, axle 530 may be an structure suitable to carry the load of a riding vehicle and couple to a steering assembly. For example, axle 530 may be configured to carry a load of at least 2000 pounds when installed on a lawn tractor. Axle 530 may be configured with one or more spindle holes. The spindle holes may be configured to receive sleeves, bushing, bearings and/or the like. The spindle hole may also be configured to receive a spindle assembly. Axle 530 may also be configured with one or more steering system mounting holes. The steering system mounting holes may be configured with threads or other suitable coupling mechanisms. Axle 530 may be configured to couple to a steering system assembly with a fastener such as, for example, a bolt.

Axle 530 may be made of any suitable material to carry a load and inhibit wear. Axle 530 may be monolithic. For example, Axle 530 may be made of a metal (e.g. steel, titanium, an alloy, and the like), a composite, a polymer or any other suitable material, now known or hereinafter devised. Axle 530 may comprise multiple components coupled together. Moreover, axle 530 may be cast, pressed, sintered, die-cut, machined, stamped, bonded, laminated, polished, smoothed, bent, rolled, molded, plated, coated, and/or otherwise shaped and/or formed via any suitable method and/or apparatus. Axle 530 may comprise various geometries for reducing weight. Moreover, axle 530 may comprise various geometries for reducing stress or bearing a load.

Figure 6:
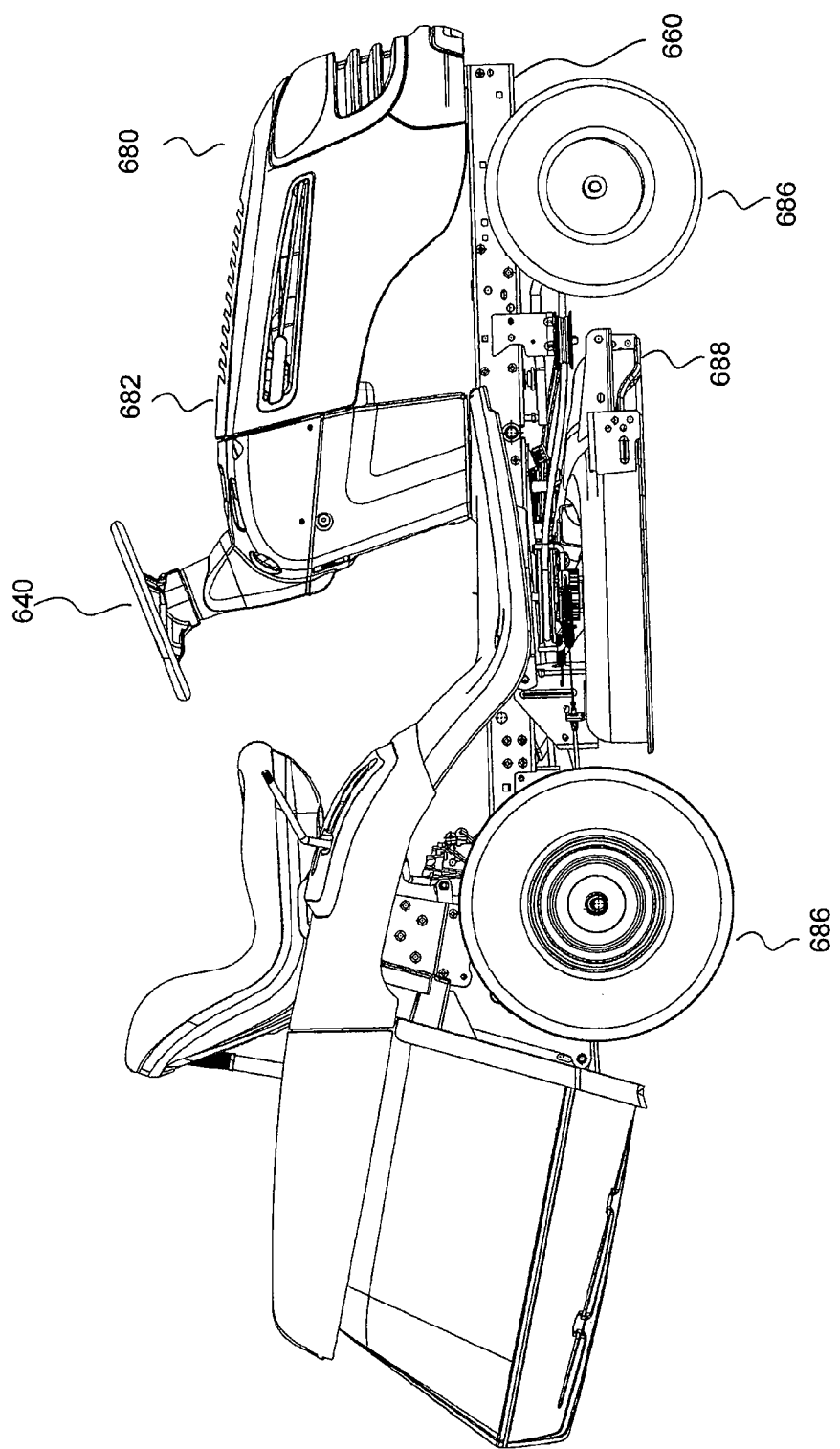
FIG. 6 illustrates an exemplary riding lawn mower, in accordance with an exemplary embodiment.

In an exemplary embodiment, and with reference to FIG. 6, the STRSS 100 may be provided as a component of a mowing system. STRSS 100 may be coupled to or installed on a riding lawnmower 680. Riding lawnmower 680 may be any lawnmower, lawn-tractor, or other suitable riding vehicle configured with a short turn radius. Riding lawnmower 680 may be configured to accept and obtain power from a motor. Moreover, the riding lawnmower may comprise user input 640, frame 660, a body 682, wheels 686, a cutting deck 688, and various other components including, for example, gauges, lights, a fuel tank, a starting system, and/or the like.

Riding lawnmower 680 may be configured with any type of cutting deck 686 including, for example, a center rear discharge cutting deck, a side discharge cutting deck, or any other suitable configuration now known or hereinafter devised. Moreover, riding lawnmower 680 may employ any accessory available or otherwise configured to interface with riding lawnmower 680 including, for example, a vacuum system, a bagging system, a blower system, or any other system now known or hereinafter devised.

While the principles of this disclosure have been shown in various embodiments, many modifications of structure, arrangements, proportions, elements, materials and components (which are particularly adapted for a specific environment and operating requirements) may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:

1. A short turn radius steering system, comprising:
    a first linkage configured to move in a first direction;
    a first pivot bracket coupled to the first linkage;
    a first bracket linkage configured to move in a second direction and coupled to the first pivot bracket, the first bracket linkage moving linearly in the second direction responsive to rotation of the first pivot bracket caused by linear movement of the first linkage in the first direction;
    a first spindle assembly coupled to the first pivot bracket via the first bracket linkage;
    an axle, wherein the first pivot bracket is configured to rotatably couple to the axle;
    a second linkage configured to move in the first direction;
    a second pivot bracket coupled to the second linkage, wherein the second pivot bracket is configured to rotatably couple to the axle;
    a second bracket linkage configured to move in a third direction and coupled to the second pivot bracket, the second bracket linkage moving linearly in the third direction responsive to rotation of the second pivot bracket caused by linear movement of the second linkage in the first direction; and
    a second spindle assembly coupled to the second pivot bracket via the second bracket linkage.

2. The system of claim 1, further comprising a first pivot bolt, wherein the first pivot bolt comprises a rotating surface and an engagement, wherein the rotating surface of the first pivot bolt is configured to support the first pivot bracket, and the engagement couples to the axle.

3. The system of claim 2, wherein the first pivot bolt defines a hollow cavity along a centerline of the first pivot bolt and a cross passage perpendicular to the centerline.

4. The system of claim 3, wherein the hollow cavity is configured to receive a lubricant.

5. The system of claim 1, wherein the first spindle assembly comprises a spindle arm and a pitman arm, and wherein the first pivot bracket is configured to conduct a force from the first linkage to the pitman arm, which causes the first spindle to move.

6. The system of claim 5, further comprising a first wheel coupled to the first spindle.

7. The system of claim 6, wherein the pitman arm comprises a tab that is configured to restrict the first wheel from turning more than 90 degrees in one direction.

8. The system of claim 1, wherein the steering system is configured to provide a turn radius of approximately 5 inches.

9. The system of claim 1, wherein the first direction is perpendicular to the second direction, the first direction is perpendicular to the third direction, and the second direction is opposite the third direction.

10. A riding lawnmower, comprising:
a steering system, comprising:
- a first steering linkage;
- a first pivot bracket coupled to the first steering linkage;
- a first spindle assembly coupled to the first pivot bracket, wherein the first steering linkage is configured to move linearly in a first direction causing the first pivot bracket to rotate to apply a force to the first spindle assembly via linear movement of a first bracket linkage in a second direction, the first bracket linkage coupling the first pivot bracket to the first spindle assembly;
- an axle, wherein the first pivot bracket is configured to rotatably couple to the axle to operatively couple the steering system to the axle;
- a first wheel rotatably coupled to the first spindle assembly;
- a second steering linkage;
- a second pivot bracket coupled to the second steering linkage, wherein the second pivot bracket is configured to rotatably couple to the axle to operably couple the steering system to the axle;
- a second spindle assembly coupled to the second pivot bracket, wherein the second steering linkage is configured to move linearly in the first direction causing the second pivot bracket to rotate to apply a force to the second spindle assembly via linear movement of a second bracket linkage in a third direction, the second bracket linkage coupling the second pivot bracket to the second spindle assembly; and
- a second wheel rotatably coupled to the second spindle assembly.

11. The lawnmower of claim 10, further comprising a user input coupled to the first steering linkage, wherein the user input is configured to provide inputs to the steering system.

12. The lawnmower of claim 10, wherein the first spindle assembly comprises a first spindle arm and a first pitman arm.

13. The lawnmower of claim 12, wherein the first pitman arm comprises a tab that is configured to contact the axle to restrict the first wheel from turning more than 90 degrees in one direction.

14. The lawnmower of claim 10, wherein the axle comprises a lubricating system that is configured to provide a lubricant to the first spindle assembly to reduce at least one of wear and contamination.

15. The lawnmower of claim 10, wherein the second spindle assembly causes the second wheel to turn sharper than the first wheel.

16. The lawnmower of claim 10, wherein the steering system further comprises a first pivot bolt configured to rotatably couple the first pivot bracket to the axle, wherein the first pivot bolt is configured to receive a lubricant to reduce at least one of wear and contamination between the first bolt and the first pivot bracket.

17. A method for operating a lawnmower comprising:
- receiving an input at a user input, wherein the input is translated from the user input to a first linkage and a second linkage, wherein a steering system comprises the first linkage, a first pivot bracket, a first spindle assembly, a first bracket linkage, the second linkage, a second pivot bracket, an axle rotatably coupled to at least the first pivot bracket, a second spindle assembly, and a second bracket linkage, wherein the first linkage is coupled to the first pivot bracket and the first pivot bracket is coupled to the first spindle assembly via the first bracket linkage, and wherein the second linkage is coupled to the second pivot bracket and the second pivot bracket is coupled to the second spindle assembly via the second bracket linkage;
- turning a first wheel in response to the input, wherein the input is provided from linear movement of the first linkage in a first direction through the first pivot bracket to the first spindle assembly via linear movement of the first bracket linkage in a second direction, and wherein the first wheel is coupled to the first spindle assembly; and
- turning a second wheel in response to the input, wherein the input is provided from linear movement of the second linkage in a third direction through the second pivot bracket to the second spindle assembly via linear movement of the second bracket linkage in the second direction, wherein the second wheel is coupled to the second spindle assembly.

18. The method of claim 17, wherein the second wheel is turned sharper than the first wheel.

19. The method of claim 18, wherein the second wheel is turned 90 degrees in one direction.

\* \* \* \* \*